United States Patent
Chun et al.

(10) Patent No.: US 8,562,125 B2
(45) Date of Patent: Oct. 22, 2013

(54) CONCENTRATED INKJET INK

(71) Applicant: Hewlett-Packard Development Company, L.P., Fort Collins, CO (US)

(72) Inventors: Doris Pik-Yiu Chun, Santa Clara, CA (US); Thomas Anthony, Sunnyvale, CA (US); Hou T. Ng, Campbell, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/868,791

(22) Filed: Apr. 23, 2013

(65) Prior Publication Data

US 2013/0235132 A1    Sep. 12, 2013

Related U.S. Application Data

(62) Division of application No. 12/916,254, filed on Oct. 29, 2010, now Pat. No. 8,430,494.

(51) Int. Cl.
| | |
|---|---|
| *G01D 11/00* | (2006.01) |
| *B41J 2/17* | (2006.01) |
| *C09D 11/00* | (2006.01) |
| *G03G 9/00* | (2006.01) |
| *G03G 5/00* | (2006.01) |

(52) U.S. Cl.
USPC ....... 347/100; 347/95; 106/31.13; 106/31.65; 430/112; 430/137.22

(58) Field of Classification Search
USPC ............. 347/95, 100; 103/31.13, 31.65; 430/112, 137.22
See application file for complete search history.

(56) References Cited

U.S. PATENT DOCUMENTS

| | | |
|---|---|---|
| 5,026,427 A | 6/1991 | Mitchell et al. |
| 5,345,296 A | 9/1994 | Wellings |
| 5,530,533 A | 6/1996 | Wallace |
| 5,679,138 A | 10/1997 | Bishop et al. |
| 6,136,493 A * | 10/2000 | Fujiwara et al. ............. 430/116 |
| 7,402,614 B2 | 7/2008 | Marguerettaz et al. |
| 2006/0001726 A1 | 1/2006 | Kodas et al. |
| 2006/0023041 A1 | 2/2006 | Brenner et al. |
| 2008/0262122 A1 | 10/2008 | Ueno et al. |
| 2008/0275163 A1 | 11/2008 | Liu |
| 2010/0026743 A1 * | 2/2010 | Van Thillo et al. .......... 347/100 |
| 2012/0026224 A1 | 2/2012 | Anthony et al. |

FOREIGN PATENT DOCUMENTS

| | | |
|---|---|---|
| WO | WO 98/44058 | 10/1998 |
| WO | WO 2008/054386 A1 | 5/2008 |

* cited by examiner

*Primary Examiner* — Jannelle M Lebron (57) ABSTRACT

A concentrated inkjet ink for packaging includes a liquid composition present in an amount that is less than 60 wt % of the concentrated inkjet ink, and nonvolatile solids present in an amount ranging from about 40 wt % to about 90 wt % of the concentrated inkjet ink. The nonvolatile solids include encapsulated pigment particles having a particle size ranging from about 50 nm to about 500 nm, and a dispersant. The concentrated inkjet ink is dispersible in an ink vehicle to form a print ready inkjet ink.

11 Claims, 4 Drawing Sheets

Fig-5

CONCENTRATED INKJET INK

CROSS-REFERENCE TO RELATED APPLICATION

This application is a divisional of co-pending U.S. application Ser. No. 12/916,254, filed Oct. 29, 2010, which is incorporated by reference herein in its entirety.

BACKGROUND

Liquid-based inks often contain a relatively large amount of carrier fluid. In some cases, the carrier fluid may take up about 75 vol % to about 90 vol % of the total amount of the ink. Due, at least in part, to the presence of such a large amount of carrier fluid, the ink may require relatively large containers because they occupy a significant amount of space in terms of volume. This may, in some instances, adversely affect shipping and/or ink storage practices.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to ink forming methods. Pigment-based inkjet inks that are printable (i.e., print ready inkjet inks) using an inkjet printer often contain an ink vehicle having a colorant dispersed therein. As used herein, the term "ink vehicle" refers to the combination of a carrier fluid and, in some instances, one or more additives to form the vehicle in which the colorant may be dispersed. Further, the term "carrier fluid" refers to the liquid-based medium constituting the bulk of the ink vehicle, and this liquid-based medium is used to transport the colorant through the printer during printing. Examples of carrier fluids include water and oil.

Additives that may be desirable in the print ready inkjet inks include other liquid-based components (i.e., those that are in addition to the carrier fluid such as, e.g., one or more other solvents, surfactants, etc.) and/or solid-based components. All of the liquid-based components (i.e., the carrier fluid and the other liquid-based additives) together may be referred to herein as a "liquid composition". The solid-based components make up a portion of the nonvolatile solids (NVS) of the inkjet ink. These solid-based components may include a viscosity modifier and/or a polymer if one or more of these components are present in the ink. The solid-based components may also include dispersant that is used to encapsulate pigment particles, and, in some instances, additional dispersant that is not used to encapsulate pigment particles. It is to be understood that the rest of the NVS of the ink(s) disclosed herein are made up of the pigment particles.

As will be described further below, the colorant particles may be chosen from organic or inorganic pigments that are insoluble, but dispersible in the selected carrier fluid. The pigments may be obtained, for example, in a powder form that often contains agglomerates of pigment particles that are relatively large in size (e.g., the agglomerates may have an effective diameter that falls within the micrometer scale, 1 micron to 1000 microns). It may, in some instances, be desirable or necessary to break apart these large agglomerates so that the individual particles, or agglomerates of particles, are smaller than one micron. The smaller particles or agglomerates are typically desirable because they are more easily dispersed in the ink vehicle to form the print ready inkjet ink, and the resulting print ready inkjet ink may be more easily jettable from an inkjet printhead.

Examples of the ink forming method will now be described in conjunction with the flow diagrams shown in FIGS. 1 and 2. In each of these examples, the method includes deagglomerating a mixture that contains large pigment particles (i.e., diameter greater than 500 nm) to form either a deagglomerated ink (see reference numeral 100 in FIG. 1) or a modified deagglomerated ink (see reference numeral 200 in FIG. 2).

As used herein, a "deagglomerated ink" refers to a dispersion of pigment particles, dispersant(s), and carrier fluid(s) that has been subjected to a deagglomeration process such that dispersant encapsulated pigment particles are formed, where these dispersant encapsulated pigment particles have a diameter that is less than 500 nm and are present in the carrier fluid. While the dispersant encapsulated pigment particles in the deagglomerated ink are suitable for jetting, in some instances, the deagglomerated ink may have a viscosity greater than 20 cP at jetting temperatures and thus may be unsuitable for jetting. Still further, the deagglomerated ink may have a higher pigment concentration than is desired for a print ready inkjet ink.

Also as used herein, a "modified deagglomerated ink" refers to a dispersion of pigment particles, dispersant(s), carrier fluid(s), and additive(s). In one example, the pigment particles, dispersant(s), and carrier fluid(s) have been subjected to a deagglomeration process such that dispersant encapsulated pigment particles are formed, where these dispersant encapsulated pigment particles have a diameter that is less than 500 nm and are present in the carrier fluid(s). The additive(s) is/are then added (prior to concentration) to form the modified deagglomerated ink. In another example, the pigment particles, dispersant(s), additive(s), and carrier fluid (s) have been subjected to a deagglomeration process such that dispersant encapsulated pigment particles are formed, where these dispersant encapsulated pigment particles have a diameter that is less than 500 nm and are present in the carrier fluid with the additive(s). In some examples, the components of the modified deagglomerated ink qualify these inks as print ready inkjet inks.

The examples of the method shown in FIG. 1 will now be discussed. As illustrated at reference numeral 100, a mixture of pigment particles, dispersant, and carrier fluid is subjected to a deagglomeration process to form the deagglomerated ink.

It is to be understood that the pigment particles and the dispersant selected for the mixture that is subjected to deagglomeration will remain (in some form) in the concentrated ink and the final print ready inkjet ink. The pigment particles present in the mixture prior to deagglomeration have a size/diameter that is greater or equal to 500 nm, which is generally not suitable for jetting. These non-encapsulated pigments are chosen from organic pigment particles or inorganic pigments particles, and these particles may be further chosen from, for example, black pigment particles, yellow pigment particles, magenta pigment particles, red pigment particles, cyan pigment particles, blue pigment particles, green pigment particles, orange pigment particles, brown pigment particles, white pigment particles, and metallic pigment particles. Selection of one or more of these pigments may determine the color of the ink that will ultimately be formed. In an example, the inkjet ink may be formed as a yellow ink, a magenta ink, a light magenta ink, a cyan ink, a light cyan ink, a black ink, a brown ink, a red ink, a blue ink, a green ink, a violet ink, an orange ink, a white ink, or a metallic ink. The amount of pigment particles selected for the mixture is such that the resulting deagglomerated ink has a pigment loading ranging from about 5 wt % to about 25 wt %.

The dispersant used in the deagglomeration process is believed to encapsulate the pigment particles. This dispersant may be selected from ionic surfactant(s) and/or a non-ionic surfactant(s), and these surfactants are chosen to be soluble in i) an aqueous carrier if the print ready inkjet ink is to be a water-based ink dispersion, or ii) a non-aqueous carrier if the print ready inkjet ink is a non-aqueous or oil-based ink dispersion (e.g., ISOPAR® L (Exxon Co., Houston, Tex.)). The dispersant is also selected from those surfactants that can withstand the various methods that may be used to concentrate the deagglomerated ink, as described further hereinbelow. For example, the surfactant that is chosen should not have any significant phase separation or phase transition when exposed to the various concentrating process temperature ranges. Some examples of suitable ionic dispersants that are soluble in non-aqueous carriers include dioctyl sodium sulfosuccinate, the ionic surfactants of the TERGITOL® GR series (The Dow Chemical Co., Midland, Mich.), cetyltrimethyl ammonium salts, polyamines with cationic character (such as SOLSPERSE® 19000, Lubrizol Corp., Wickliffe, Ohio), and/or combinations thereof. Examples of non-ionic dispersants that are soluble in non-aqueous carriers include homopolymers or co-polymers of polyimine, polyisobutylene, secondary alcohol ethoxylates, polystearate, polyesters, polyethers, polyamines, polyacrylates, polyhaloalkanes, silicone polymers, alkanes, non-ionic polyamines (such as SOLSPERSE® 11200, Lubrizol Corp.), and/or combinations thereof.

When an aqueous carrier is used, some ethoxylates and polyacrylic acids may be used, as long as their chemical structure renders them soluble in the aqueous carrier. Examples of suitable dispersants for aqueous carriers include SOLSPERSE® 27000, SOLSPERSE® 40000, and SOLSPERSE® 46000 (all of which are available from Lubrizol Corp.).

In one example, the mixture of components subjected to deagglomeration included SOLSPERSE® 19000 dispersant (Lubrizol Corp), pigment yellow 213 pigment particles, and ISOPAR® L carrier fluid. The amount of pigment used in this example was about 6.0 wt %. It was found that when deagglomeration was performed with an amount of dispersant above a threshold concentration of about 2.55 wt %, the resulting encapsulated yellow pigment particle size was reduced to less than 500 nm (and in some instances less than 200 nm), and the resultant deagglomerated ink was stable. As used herein, a "stable" ink (e.g., deagglomerated ink, modified deagglomerated ink, print ready inkjet ink) is one in which the encapsulated pigment particles do not re-agglomerate over time (e.g., one week, one month, one year, or longer). In another example, the mixture of components subjected to deagglomeration included SOLSPERSE® 11200 (Lubrizol Corp., Wickliffe, Ohio) dispersant, pigment yellow 180 pigment particles, and ISOPAR® L carrier fluid. The amount of pigment used in this example was also about 6.0 wt %. It was found that when deagglomeration was performed with an amount of dispersant above a threshold concentration of about 1.05 wt %, the resulting encapsulated yellow pigment particle size was reduced to less than 500 nm (and in some instances less than 200 nm), and the resultant deagglomerated ink was stable.

Without being bound to any theory, it is believed that the stability of the dispersions including the colorant particles in these examples is due, at least in part, to the encapsulation of the yellow pigment by the dispersant when the concentration of the dispersant is at least 2.55 wt % (as in the first example) or at least 1.05 wt % (as in the second example). Above these threshold concentrations, it is believed that the entire pigment surface is covered with the dispersant, and excess dispersant remains dissolved in the liquid components (e.g., the carrier fluid). This excess dispersant contributes to the electrical conductivity of the dispersion, and the charge associated with the excess dispersant assists with stabilizing the dispersion. Further, the colorant particle size remains small (e.g., below 500 nm) while the encapsulation layer on the pigments prevents direct contact between the pigment surfaces. In contrast, below the threshold concentrations, it is believed that practically all of the dispersant is bound to the pigment surface, but the concentration is insufficient to encapsulate the pigment particles. Further, no free dispersant is left to contribute to electrical conductivity and/or to provide charge stabilization. Additionally, at these lower concentrations, particle agglomeration tends to occur.

The threshold concentration of the dispersant (e.g., about 2.55 wt % in the first example above and about 1.05 wt % in the second example above) may be determined as follows. The amount of the dispersant(s) needed to encapsulate the pigment particles depends, at least in part, upon the surface area ($m^2/g$) of the pigment particles. In one example, about 2 $mg/m^2$ of dispersant(s) is required to disperse, and thus encapsulate, a pigment particle. As one example, for pigment particles having a surface area ranging from about 50 $m^2/g$ to about 200 $m^2/g$, 100 mg to about 400 mg of dispersant is needed per 1 gram of pigment, or about 10% to about 40% of the total pigment weight. In the examples disclosed herein, the amount of dispersant used ranges from 5% to 100% of the total pigment weight. Based upon this calculation, the 6 wt % pigment solutions mentioned above would require from about 0.3 wt % to about 6 wt % of dispersant(s). Determining the actual threshold from the calculated range may involve measuring the particle size after deagglomeration is performed, and selecting the wt % of dispersant that gives the most desirable particle size. In other examples, the amount of dispersant used ranges from 5% to 90% of the total pigment weight, or from 5% to 50% of the total pigment weight.

As such, it is to be understood that the amount of dispersant used to encapsulate the pigment particles (i.e., during deagglomeration) is specifically selected in order to form the colorant particles having the desired particle size ranging from about 50 nm to about 500 nm. In one example, the amount of dispersant selected forms particles with a size ranging from about 100 nm to about 500 nm. In one example, the total amount of dispersant (i.e., the amount of dispersant used to encapsulate the pigment and the excess dispersant in the deagglomerated ink) ranges from about 0.25 wt % to about 25 wt % of the total wt % of the deagglomerated ink. In another example, the amount of dispersant that is used ranges from about 0.3 wt % to about 6 wt % of the components that make up the deagglomerated ink. It is to be understood that once the pigment particles have been encapsulated, any excess dispersant becomes part of the solid components of the deagglomerated ink. For instance, if the mixture includes 1 wt % of dispersant(s), and the threshold concentration of the dispersant(s) needed to encapsulate the pigments is about 0.7 wt %, then the deagglomerated ink includes about 0.3 wt % of excess dispersant(s). It is to be understood that the total amount of dispersant(s) in the deagglomerated ink (which includes the dispersants used to encapsulate the pigment particles and the excess dispersant) may, in some examples, not exceed about 10 wt %, at least in part because at higher concentrations, the presence of the dispersant may affect jetting performance, as well as color quality and adhesion.

A portion of the carrier fluid selected for the mixture that will be exposed to deagglomeration will be removed during the subsequent concentration process. As such, this carrier fluid may be the same as, or different from the carrier fluid that is ultimately selected for the final print ready inkjet ink. Examples of the carrier fluid for deagglomerating include water (e.g., for aqueous deagglomerated inks) or ISOPAR® L (e.g., for non-aqueous deagglomerated inks). For the pre-deagglomeration mixture, the amount of carrier fluid may be equal to or less than an amount that would be desirable in a print ready inkjet ink.

The deagglomerated ink may be made, for example, by adding the selected pigment particles and dispersant(s) to the carrier fluid, or visa versa, and then mixing them together by mechanical means (e.g., stirrer, shaker, homogenizer, blender, or the like) and/or by ultrasonic agitation. Deagglomeration occurs by processing the mixture, e.g., via bead milling, microfluidization, ultrasonic agitation, high shear mechanical mixing, or the like. The mixture may be processed for an amount of time sufficient to deagglomerate the pigment particles, thereby forming the deagglomerated ink.

In one example of the deagglomeration process, the particles may be prepared using a bead milling process, where a mixture is prepared by mixing a carrier fluid, dispersant, and pigment agglomerates in a high shear mixer, such as a T 25 digital ULTRA-TURRAX® homogenizer (IKA® Works, Inc, Wilmington, N.C.). The mixing may be performed for an amount of time sufficient to completely or substantially uniformly distribute the pigment agglomerates in the carrier fluid. In one example, mixing may be accomplished for about 5 minutes to about 30 minutes. The mixture may thereafter be processed in, e.g., a UAM015 bead mill (Kotobuki Industries, Japan) for about 10 minutes to about 30 minutes. This process causes the pigment agglomerates to deagglomerate into discrete particles and smaller agglomerates (e.g., less than 500 nm), which become encapsulated in the dispersant. For instance, during bead milling, the impact from the milling media disintegrates the pigment agglomerates into discrete particles with a pigment particle size falling within the nanometer range (e.g., less than 500 nm). Also during bead milling, the dispersant(s) migrate toward the discrete pigment particles, and attach themselves onto the surfaces thereof (via physisorption and/or chemisorption) to form an encapsulation layer on the particles. It is to be understood that since the dispersant(s) do not covalently bond to the surfaces of the pigment particles, the diffusion of the dispersant(s) within the ink is dynamic and reversible. Without being bound to any theory, it is believed that upon reaching equilibrium, which may occur at or above the threshold concentration of the dispersant(s), all of the pigment particles are encapsulated and stabilized.

The colorant particles that form as a result of the deagglomeration process are pigment particles that are encapsulated with the dispersant. The colorant particles processed in this or a like manner (i.e., the pigment particles encapsulated with the dispersant) have a particle size within the desired range of about 50 nm to about 500 nm. Colorant particles falling within this size range are printable from an inkjet printhead. These encapsulated colorant particles should stay intact when the deagglomerated ink is concentrated as described below. A stable dispersion may be formed, e.g., by first surrounding the pigment particles (which constitute the discontinuous phase of the dispersion) with the dispersant, and then dispersing these particles in the carrier fluid (i.e., the continuous phase of the dispersion). As mentioned herein, the surrounding of the pigment particles with the dispersant may be accomplished, for example, by encapsulating the pigment particles with the dispersant during the deagglomeration process. It is believed that the encapsulated pigments (compared to non-encapsulated pigments) are more easily dispersed in a carrier fluid after the concentrated form of the ink is shipped and/or stored. It is further believed that by encapsulating the pigments, the particle size of the colorant may be controlled.

The mixture is subjected to deagglomeration, in part, to form usable pigment particles or pigment particle agglomerates (i.e., those having a size/diameter than is less than 500 nm, and thus are jettable from an inkjet printhead).

In an example, the deagglomerated ink has an NVS concentration of about 30 wt % or less. It is to be understood, however, that storage and/or shipping of these deagglomerated inks may, in some instances, pose some challenges with respect to i) shipping costs, at least because the ink is heavier (in terms of weight) and takes up more space (in terms of volume), and ii) storage and/or packaging costs due, at least in part, to a high packaging volume. In some cases, the shelf life of the ink may be reduced, at least in part because the NVS may settle out of the liquid-based components of the ink during storage.

Figure 1:
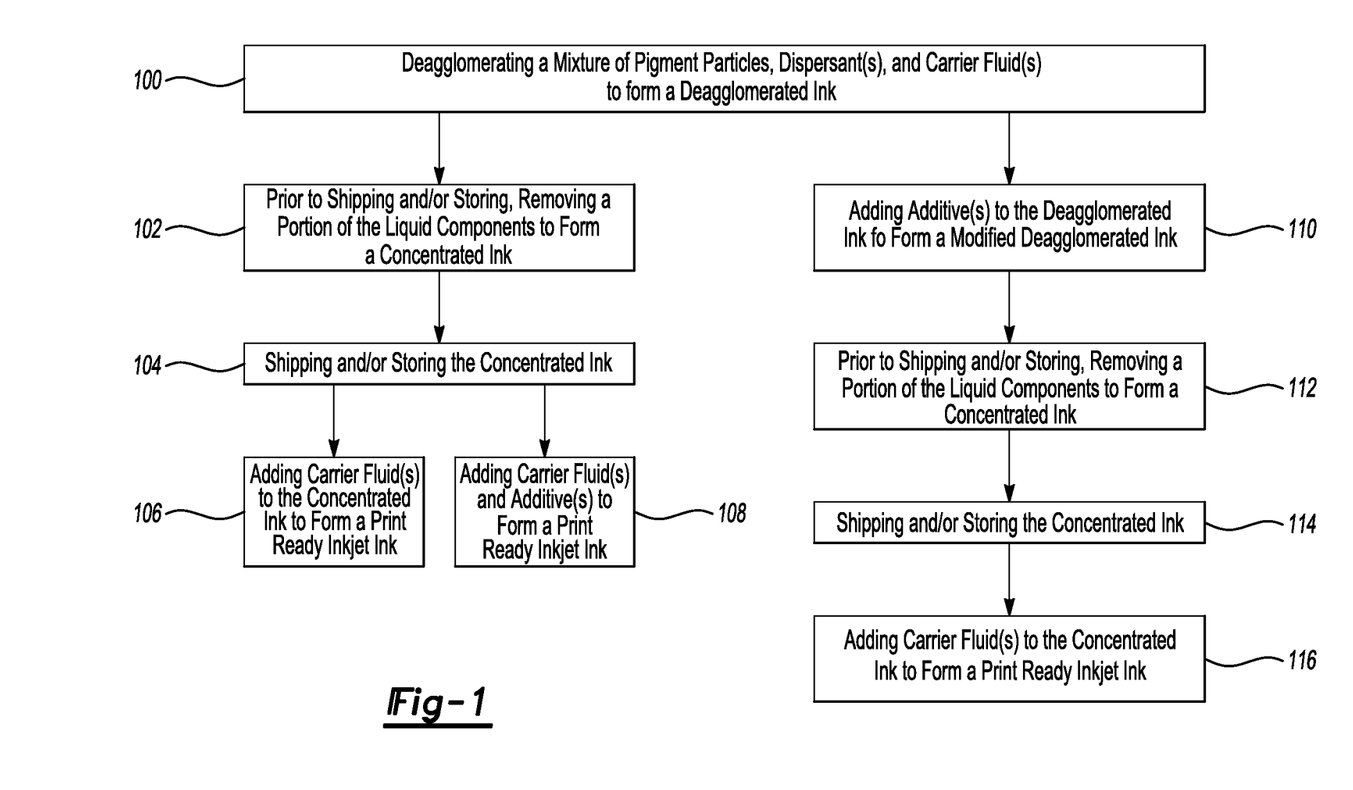
FIG. 1 is a flow diagram illustrating multiple examples of an ink forming method as disclosed herein.

In one example, a portion of the liquid component(s) of the deagglomerated ink is removed to form a concentrated ink (as shown by reference numeral 102 in FIG. 1). In another example, the deagglomerated ink has additive(s) added thereto to prepare a modified deagglomerated ink (as shown by reference numeral 110 in FIG. 1), and then a portion of the liquid components of the modified deagglomerated ink is removed to form the concentrated ink (shown by reference numeral 112 in FIG. 1). In these example(s), the deagglomerated ink or the modified deagglomerated ink is concentrated so that the concentrated form of the respective ink has an NVS content that is at least about 40 wt %. This concentrated form of the respective inks (which may be referred to herein as a concentrated ink) advantageously improves one or more of the shipping, packaging, and/or storage challenges identified above. After the concentrated ink has been stored and/or shipped (see reference numerals 104 and 114 of FIG. 1), the concentrated ink may be dispersed in a carrier fluid (see reference numerals 106 and 116 of FIG. 1) or a carrier fluid and additive(s) (see reference numeral 108 in FIG. 1) to form an ink that is jettable from an inkjet printhead.

Referring back to reference numeral 102 in FIG. 1, it has been found that the deagglomerated ink is more favorable for storage and/or shipping when the deagglomerated ink is in a more concentrated form. Accordingly, prior to storing and/or shipping of the deagglomerated ink, all or a portion of the liquid component(s) is removed to form a concentrated ink (as shown by reference numeral 102 in FIG. 1). This concentrated ink has, in an example, an NVS content ranging from about 40 wt % to about 90 wt % of the concentrated ink. In another example, a portion of the liquid component(s) is removed to form a concentrated ink having an NVS content ranging from about 50 wt % to about 80 wt % of the concentrated ink. It is to be understood that, in some cases, the concentrated ink includes at least a small amount of the liquid component(s) (e.g., carrier fluid used during deagglomeration). The presence of this small amount liquid in the concentrated ink allows the concentrated ink to be more easily dispersed in an ink vehicle to form an inkjet printable ink (i.e., a print ready inkjet ink). In an oil based ink, it is believed that the oleophilic, apolar tail of the dispersant helps retain the small amount of liquid in the immediate vicinity of the pigment, which impedes agglomeration and facilitates re-dispersion.

In an example, the portion of the liquid component(s) that is removed from the deagglomerated ink to form the concentrated ink is greater than about 40 wt % and less than about 100 wt % of the liquid component(s). In another example, at least 5 wt % of the liquid component(s) is still present in the concentrated form. When the concentrated ink includes at least some of the liquid component(s) (e.g., at least about 5 wt % as mentioned above), it is believed that the remaining liquid forms a barrier between the colorant particles, which prevents the particles from re-agglomerating. It is further believed that the concentrated ink in this form is more readily re-dispersible in an ink vehicle to form an inkjettable ink, as described below. It is to be understood that the concentrated ink may, in some instances, contain no liquid component(s) (i.e., 0 wt % of the liquid component(s) remains after concentration). In these instances, it is believed that no barrier forms between the individual, dispersant encapsulated colorant particles. As such, re-dispersion of the concentrated ink is possible, but may, in some cases, be more difficult than when some of the liquid component(s) remains in the concentrated ink.

The removal of all or the portion of the liquid component(s) to form the concentrated ink may be accomplished using a number of different techniques. Examples of these techniques include centrifugation, filtration, and/or evaporation, and these examples are described in some detail hereinbelow.

In one example, centrifugation may be used in instances when the pigment particles have a higher density than the liquid component(s). Centrifugation in this case may suitably separate the more dense pigment particles (and other solids) from the liquid. For instance, the deagglomerated ink may be placed in a centrifuge, which spins at a predetermined rate. Centrifugal forces cause the more dense colorant particles to separate away from (e.g., they may settle towards the outer diameter of the centrifuge) the less dense liquid component(s). The speed, time, and/or temperature of the centrifuge may be controlled to control the separation of the colorant particles from the liquid component(s). After centrifugation, decanting may be performed to remove the separated liquid component(s). In an example, most of the liquid component(s) (e.g., at least 80%) may be removed via decanting. Although decanting removes most of the liquid component(s), it is to be understood that some of the liquid component(s) typically remains with the solids.

Another example of removing all or the portion of the liquid component(s) includes filtration. In this technique, the pigment particles (and other solids) may be extracted from the liquid component(s) using filters with appropriately sized pores. It is to be understood that a small amount of the liquid component(s) typically remains on the filtered NVS. In one example, the NVS of the concentrated ink extracted by filtering is less than about 80 wt %.

Yet another example of removing all or the portion of the liquid component(s) includes evaporation of a selected portion of the liquid component(s). This may be accomplished by heating the liquid component(s) for an amount of time sufficient to evaporate a selected portion of the liquid component(s). Upon heating, the vapor pressure of the liquid component(s) increases, which causes the liquid component(s) to change phase and separate from the colorant particles. The rate of evaporation may also be increased by passing air over the liquid component(s), or by operating the evaporation in a vacuum.

As one example, evaporation may be accomplished by spray drying, where a fine particle mist of the deagglomerated ink is sprayed, e.g., from a nozzle. During the spray drying, the deagglomerated ink is converted into a flow of small diameter droplets (e.g., less than 1 mm in diameter), which increases the surface area-to-volume ratio of the deagglomerated ink. Since the evaporation rate is proportional to the liquid surface area, evaporation from a large number of small droplets will be faster than evaporation from a single large droplet having the same volume.

The concentrated ink formed at reference numeral 102 of FIG. 1 by any of the methods described above contains a liquid composition that is present in an amount that is less than about 60 wt % of the total wt % of the concentrated ink. The concentrated ink further includes NVS present in an amount ranging from about 40 wt % to about 90 wt % of the concentrated ink. In an example, the concentrated ink includes encapsulated pigments ranging from about 25 wt % to about 70 wt % of the total NVS in the concentrated ink and a dispersant (which includes any dispersant contributing to the NVS of the ink) ranging from about 2 wt % to about 30 wt %, or from about 5 wt % to about 20 wt %.

Once the concentrated ink has been formed, the ink may be packaged and stored and/or shipped (see reference numeral 104 in FIG. 1).

When an ink in inkjettable form is desired (such as, e.g., after the concentrated ink has been shipped and/or after a period of time in storage), in an example, the method further includes dispersing the concentrated ink in a carrier fluid (see reference numeral 106 in FIG. 1) or in a carrier fluid and additive(s) (see reference numeral 108 in FIG. 1) to form a print ready inkjet ink.

The carrier fluid may be the same or different than the carrier fluid used for deagglomeration. The carrier fluid selected to form the inkjettable ink is one that will disperse the encapsulated pigments (and other solids, e.g., excess dispersant) that are present in the concentrated ink. It is to be understood that the carrier fluid may be a single fluid or a combination of fluids, as long as the fluid(s) selected render the newly formed ink as suitably jettable from an inkjet printhead. When water is selected as the carrier fluid, then the ink formed may be referred to herein as a water-based ink dispersion. When an oil is selected as the carrier fluid, then the ink formed may be referred to herein as an oil-based ink dispersion.

As mentioned in reference to reference numeral 108 in FIG. 1, one or more additives may be added with the carrier fluid when formulating the print ready inkjet ink from the concentrated ink. Examples of suitable additives include viscosity modifiers, polymers, and/or additional dispersants. Other suitable additives may include solvents, surfactants, and/or other liquid additives commonly incorporated into inkjet ink formulations (such as, e.g., a biocide). Additives may be added in any suitable amount that will not deleteriously affect the printability of the inkjet ink, and may be optimized for desired print performance (e.g., print quality, jettability, etc.).

In examples where the inkjet ink is an oil-based ink dispersion, it may be desirable to include the viscosity modifier. This viscosity modifier may be part of the nonvolatile solids (NVS) present in the ink. In one example, the viscosity modifier is a polymer that may be chosen to control the rheology of the oil-based ink, such as to reduce the tendency of the oil-based carrier's viscosity to change with changes in temperature and/or to adjust the magnitude of the viscosity of the ink. Some examples of viscosity modifiers include high molecular weight polymers (e.g., polymers having a molecular weight that is above about 100,000 atomic mass units (amu), such as polyisobutylene and polyethylene), and low molecular weight polymers (e.g., polymers having a molecular weight that is below 100,000 atomic mass units (amu), such as polystearic acid, fatty amines, and combinations thereof). In an example, the viscosity modifier, if incorporated in the inkjet ink, may be present in an amount that is less than about 10 wt % of the total wt % of the ink. In another example, the viscosity modifier is present in an amount ranging from about 0.1 wt % to about 6 wt % of the total wt % of the ink.

As mentioned above, in an example, the inkjet ink may include other polymer additives, e.g., to enhance ink durability after printing. These other polymers are also part of the NVS of the ink. Some examples of these polymers include polyethylene or polyethylene derived copolymers such as polyethyl methacrylate (PEMA), polyethyl acrylate-co-acrylate (PEAA), poly(ethylene-co-methacrylic acid (PEMAA), and/or combinations thereof. In an example, the amount of polymer, if incorporated in the ink, may be present in an amount that is less than about 10 wt % of the total wt % of the ink. In another example, the amount of polymer that is present ranges from about 0.1 wt % to about 10 wt % of the total wt % of the ink.

In an example, the amount of colorant particles present in the inkjet ink ranges from about 3 wt % to about 20 wt % of the total wt % of the ink. As stated above, these colorant particles make up at least part of the NVS of the inkjet ink. In instances where the encapsulated colorant particles (i.e., the particles and the dispersant) constitute all of the NVS of the ink, the total amount of NVS present in the ink may range from about 3 wt % to about 30 wt %. In instances where the ink contains other NVS, the total amount of NVS present in the inkjet ink ranges from about 3 wt % to about 35 wt % of the ink. In one example, the new inkjet ink formed via the method shown at reference numerals 100 through 106 contains about 3 wt % to about 10 wt % of pigment particles, about 0.3 wt % to about 5 wt % of dispersant (all of the dispersant that contributes to the NVS of the inkjet ink, which includes the encapsulation layer and any excess dispersant), and a balance is the carrier fluid. In another example, the new inkjet ink formed via the method shown at reference numerals 100 through 104 and 108 contains the colorant particles and the dispersant present in the amounts recited immediately above, and further includes from about 0.1 wt % to about 3 wt % of a viscosity modifier and a balance of the carrier fluid.

The concentrated ink may be dispersed in the carrier fluid (s) using any suitable dispersion process. For instance, the concentrated ink may be added to the selected carrier(s) (with or without additive(s)), or visa versa, and the components may be mixed together. The mixing may be performed via any of ultrasonic mixing or mechanical mixing. One example of ultrasonic mixing includes ultrasonic agitation. Examples of mechanical mixing include high shear mechanical mixing, high pressure mixing, shaking, pumping, and/or the like, and/or combinations thereof. The mixing may be performed for any amount of time sufficient to completely/substantially completely disperse the concentrated ink into the carrier fluid (s).

Referring now to the example of the method shown in FIG. 1 at reference numerals 100 and 110 through 116, in this example, deagglomerating occurs as previously described, and a deagglomerated ink is formed. In this example however, one or more additive(s) are added to the deagglomerated ink after the deagglomeration process is complete to form a modified deagglomerated ink, as shown at reference numeral 110. Any of the previously described additives may be added, such as viscosity modifiers, polymers, and/or additional dispersants. Liquid additives may be added at this point if desired. The determination as to whether liquid additives should be added may depend, at least in part, upon the concentration method to be used. For example, it may be desirable to add liquid additives when evaporation techniques are used, because these techniques remove high vapor pressure liquids alone. For another example, it may be undesirable to add liquid additives when filtering and centrifugation are used, because these techniques are not selective as to which liquids are removed. It is to be understood that in this example, additional carrier fluid(s) may also be added at this step.

It is to be understood that any of the solid additive(s) added to the deagglomerated ink to form the modified deagglomerated ink will become part of the concentrated ink and part of the final print ready inkjet ink. As such, the amount of solid additive(s) added to the deagglomerated ink will depend upon the desired amount in both the concentrated ink and the print ready inkjet ink. In one example, the viscosity modifier(s) and/or the polymer(s) will be added in amounts of 10 wt % or less and the additional amount of dispersant(s) added will not put the total amount of dispersant over 10 wt %.

As shown at reference numeral 112 in FIG. 1, the modified deagglomerated ink (having the additive(s) added therein) is concentrated via any of the method described hereinabove (e.g., in reference to reference numeral 102). The concentrated ink formed in this example contains a liquid composition that is present in an amount that is less than about 60 wt % of the total wt % of the concentrated ink, and NVS that are present in an amount ranging from about 40 wt % to about 90 wt % of the concentrated ink. In an example, the concentrated ink includes encapsulated pigments ranging from about 25 wt % to about 70 wt % of the total NVS in the concentrated ink, a dispersant (which includes any dispersant contributing to the NVS of the ink) ranging from about 2 wt % to about 30 wt %, or from about 5 wt % to about 20 wt %, a viscosity modifier in an amount that is less than about 10 wt % of the total wt % of the concentrated ink and/or polymer(s) in an amount that is less than about 10 wt % of the total wt % of the concentrated ink.

The concentrated ink may then be shipped and/or stored, as shown at reference numeral 114.

In this example of the method, when it is desirable to form the print ready inkjet ink from the concentrated ink formed in reference numeral 112, suitable carrier fluid(s) is/are added to the concentrated ink. The carrier fluid may be the same or different than the carrier fluid used for deagglomeration. The carrier fluid selected to form the inkjettable ink is one that will disperse the encapsulated pigments (and other solids, e.g., additive(s), excess dispersant) that are present in the concentrated ink. It is to be understood that the carrier fluid may be a single fluid or a combination of fluids, as long as the fluid(s) selected render the newly formed ink as suitably jettable from an inkjet printhead.

Since desired additive(s) have already been added in this example of the method, in one example, no additives are added when the carrier fluid(s) is/are added to form the print ready inkjet ink. However, it is to be understood that if other additive(s) are desirable (e.g., one or more liquid additives not previously added), these additional additive(s) may also be added at this point.

The concentrated ink may be dispersed in the carrier fluid(s) using any suitable dispersion process as previously described, such as ultrasonic mixing or mechanical mixing. The mixing may be performed for any amount of time sufficient to completely/substantially completely disperse the concentrated ink into the carrier fluid(s).

Figure 2:
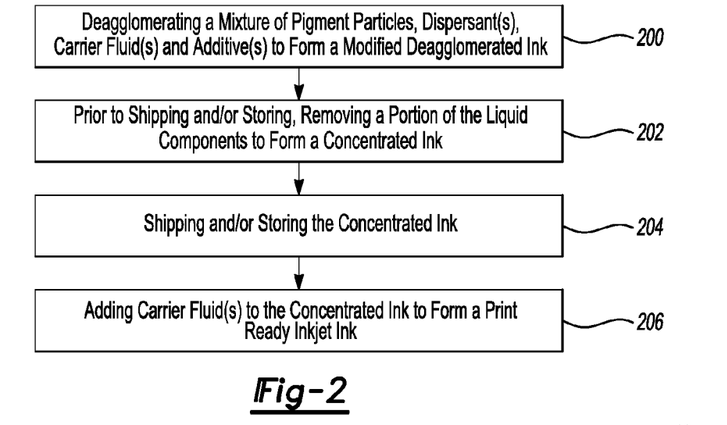
FIG. 2 is a flow diagram illustrating another example of an ink forming method as disclosed herein.

Referring now to FIG. 2, this example of the method begins by subjecting a mixture of pigment particles, dispersant(s), additive(s) and carrier fluid(s) to a deagglomeration process to form the modified deagglomerated ink (see reference numeral 200). The deagglomeration process is performed as previously described, except that one or more additives are added to the mixture prior to performing deagglomeration. It is to be understood that the same types and amounts of pigment particles, dispersant(s), additive(s) and carrier fluid(s) as previously described may be selected for incorporation into this mixture.

After deagglomeration occurs, the modified deagglomerated ink is formed (e.g., including encapsulated pigment particles, excess dispersant(s), additive(s), and carrier fluid(s)). Prior to shipping and/or storing, the modified deagglomerated ink is subjected to any of the concentration processes described herein to form another example of the concentrated ink (see reference numeral 202 in FIG. 2).

This example of the concentrated ink may then be shipped and/or stored, as shown at reference numeral 204.

In this example of the method, when it is desirable to form the print ready inkjet ink from the concentrated ink formed in reference numeral 202, suitable carrier fluid(s) is/are added to the concentrated ink (see reference numeral 206). The carrier fluid may be the same or different than the carrier fluid used for deagglomeration. The carrier fluid selected to form the inkjettable ink is one that will disperse the encapsulated pigments and other solids (e.g., additive(s), excess dispersant) that are present in the concentrated ink. It is to be understood that the carrier fluid may be a single fluid or a combination of fluids, as long as the fluid(s) selected render the newly formed ink as suitably jettable from an inkjet printhead.

Since desired additive(s) have already been added in this example of the method, in one example, no additives are added when the carrier fluid(s) are added to form the print ready inkjet ink. However, it is to be understood that if other additive(s) are desirable (e.g., one or more liquid additives not previously added), these additional additive(s) may also be added at this point.

The concentrated ink may be dispersed in the carrier fluid(s) using any suitable dispersion process as previously described, such as ultrasonic mixing or mechanical mixing. The mixing may be performed for any amount of time sufficient to completely/substantially completely disperse the concentrated ink into the carrier fluid(s).

Any of the print ready inkjet inks formed from the concentrated inks disclosed herein may be printed via an inkjet printing system. Some examples of inkjet printing systems include continuous inkjet printers, thermal inkjet printers, drop-on-demand inkjet printers, piezoelectric inkjet printers, digital inkjet printers, electrophotographic printers, and/or the like. Details of examples of the inkjet printing system (which is identified by reference numerals 10, 10', 10" in FIGS. 3 through 5) that may incorporate one of the foregoing types of inkjet printers (identified by reference numerals 12, 12', 12" in FIGS. 3 through 5) will be described below in conjunction with FIGS. 3 through 5.

Figure 3:
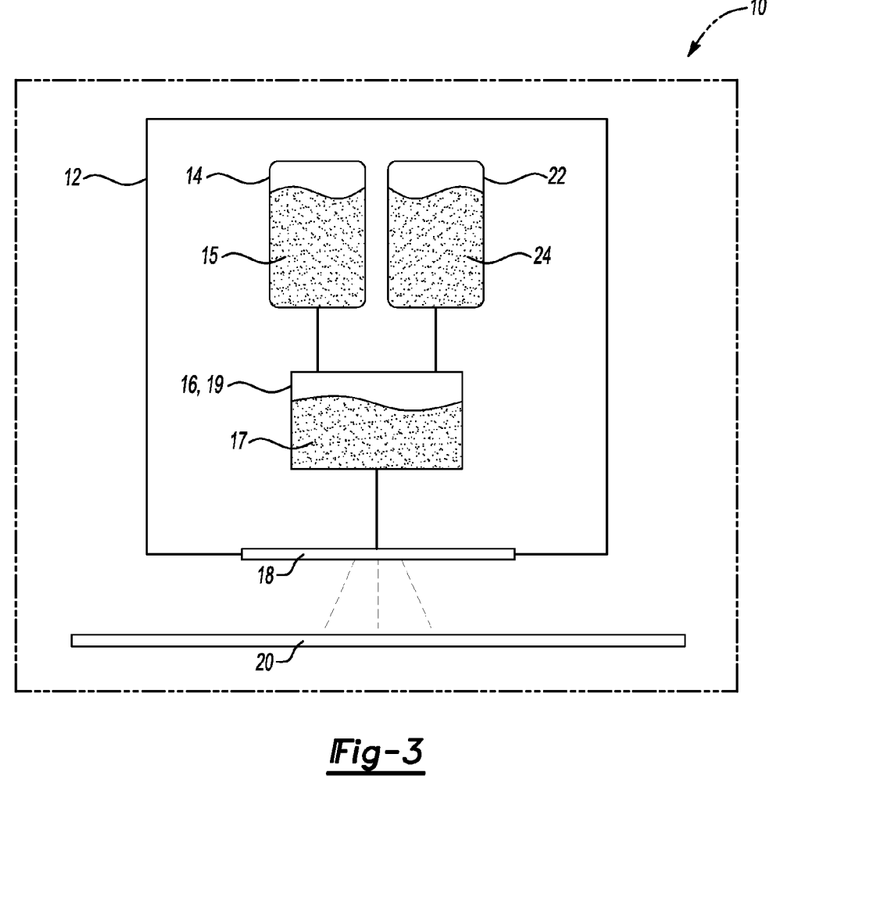
FIG. 3 schematically depicts an example of a printing system that may be used to accomplish examples of the ink forming method disclosed herein.

One example of the printing system 10 will be described herein in conjunction with FIG. 3. The printing system 10 generally includes an inkjet printer 12 having at least one printhead 18. It is to be understood that, although a single printhead 18 is shown in FIG. 3, there may be a plurality of printheads 18. In one example, the printhead 18 is fluidically coupled to an ink tank 16 that is internal to the printer 12, where the ink tank 16 contains an example of the inkjet printable ink (identified by reference numeral 17). The printhead 18 is generally configured to eject a portion of the inkjet ink 17 onto a medium 20 to form a printed image.

This example of the printer 12 further includes an ink container 14 that contains an example of the concentrated inkjet ink (identified by reference numeral 15). In one example, the ink container 14 is removable from the printer 12, and thus the ink container 14 (which contains the concentrated ink 15) is shipped and/or stored by itself (i.e., without the printer 12). In some cases, the printer 12 and the ink container 14 without the concentrated ink 15 may be packaged together and then stored and/or shipped together. In these cases, the concentrated ink 15 is added to the ink container when desired and/or needed at the printing facility.

After shipping and/or storing, if the ink container 14 is separate from the printer 12, the ink container 14 containing the concentrated ink 15 is placed or otherwise installed inside the printer 12 so that the ink container 14 is in selective fluid communication with an ink tank 16. In an example, a portion of the concentrated ink 15 is delivered to the ink tank 16, where it is dispersed in at least a carrier fluid 24 (which may also have mixed therein one or more additive(s)) to form a print ready inkjet ink (identified by reference numeral 17). The carrier fluid(s) 24 may be delivered to the ink tank 16 from a reservoir 22. The print ready inkjet ink 17 is formed in an amount that is suitable for a then-current print job. Delivery of the concentrated ink 15 and the carrier fluid(s) 24 may be accomplished via any suitable pumping architecture or other delivery means inside the printer 12. In an example, the ink tank 16 includes a disperser (which is not physically shown in FIG. 2, but is identified by reference numeral 19 in the figure) for dispersing the concentrated ink in the carrier fluid(s) (and in some instances additive(s)). The disperser 19 may be chosen from any suitable equipment to accomplish the dispersing technique selected. For instance, if dispersing is accomplished via mechanical mixing, the disperser 19 may take the form of a high shear mixer. In another instance, if dispersing is accomplished via ultrasonic mixing, the disperser 19 may take the form of an agitator. Other dispersers 19 may include equipment for high pressure mixing, equipment for mechanical pumping, and/or the like.

Figure 5:
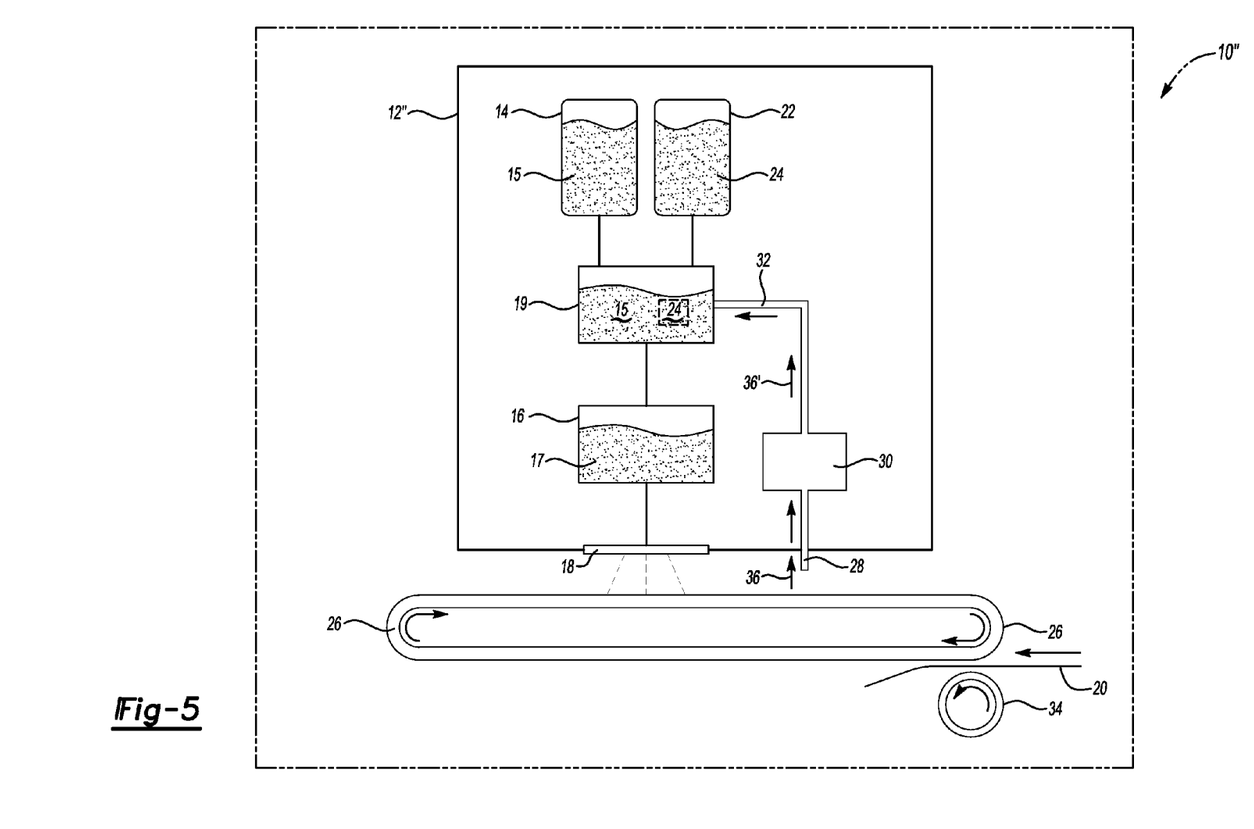
FIG. 5 schematically depicts yet another example of a printing system that may be used to accomplish examples of the ink forming method disclosed herein.

The carrier fluid 24 may be introduced into the ink tank 16 by i) introducing a fresh carrier fluid (and in some instances additive(s)) into the printing system 10, e.g., via reservoir 22, or ii) recycling a carrier fluid previously used by the printing system (this is further described in reference to FIG. 5). In instances where a fresh carrier fluid(s) is introduced, the fresh carrier fluid(s may be delivered from the reservoir 22 in the printer 12, or may be formulated, bought, or otherwise obtained by the operator of the printing system 12 from an external source and input into the printer 12 (e.g., a removable reservoir).

In another example, the ink tank 16 may be located outside of the printer 12. The concentrated ink is dispersed in the carrier fluid(s) (and in some instances additive(s)) inside the externally-located ink tank 16 to form the inkjet printable ink.

Then the ink (in inkjet printable form) may be loaded into the ink container 14 inside the printer 12.

In an example, during inkjet printing, a portion of the inkjet printable ink 17 may be retrieved from the ink tank 16, and then deposited onto the medium 20 via the printhead 18 to form a printed image on the medium 20.

Figure 4:
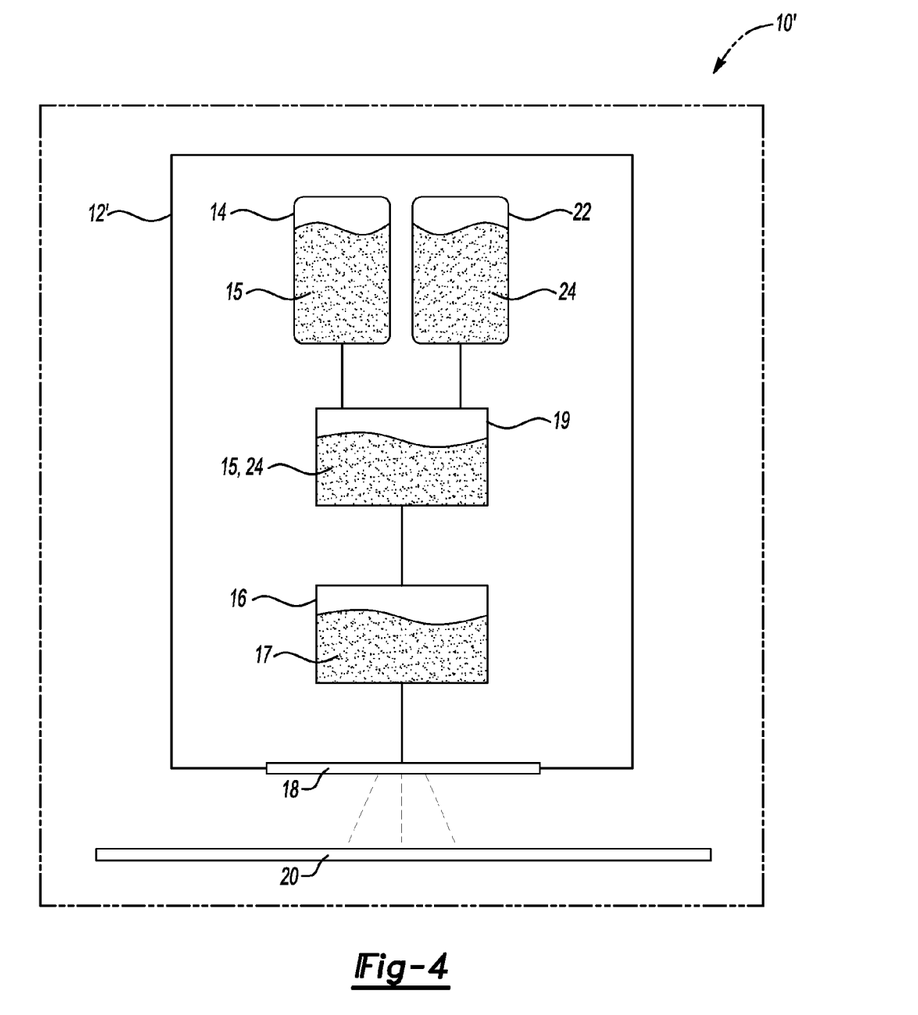
FIG. 4 schematically depicts another example of a printing system that may be used to accomplish examples of the ink forming method disclosed herein.

FIG. 4 illustrates another example of the printing system 10'. In this example, printer 12' includes a disperser 19 that is separate from an ink tank 16. The disperser 19 receives suitable portions of both the concentrated ink 15 and the carrier fluid(s) (and in some instances additive(s)), and disperses the concentrated ink in the carrier fluid(s) (and in some instances additive(s)). Any of the previously described dispersers 19 may be chosen, and in this example, the disperser 19 acts as a mixing tank for producing the print ready inkjet ink 17 from the components 15, 24. The print ready inkjet ink 17 is then routed to the ink tank 16 which is in operative communication with the printhead(s) 18 for dispensing the ink 17 from the printer 12', As previously mentioned, in some instances, the printing system 10" may recycle carrier fluid(s) that was/were previously used by routing, via suitable architecture, the carrier fluid(s) from an intermediate transfer medium 26 back to the disperser 19. In this example, the ink 17 is formulated as described in reference to FIG. 5. When printed, the ink 17 is deposited onto the heated intermediate transfer medium 26 (which is a rotating belt or drum). As the heated intermediate transfer medium 26 rotates, the deposited ink 17 is moved such that it passes by a suction tube 28, which collects the evaporated carrier fluid(s) 36 and leaves the ink solid(s) (not shown) on the intermediate transfer medium 26. The collected evaporated carrier fluid(s) 36 is/are condensed via a condenser 30 and then the condensed carrier fluid(s) 36' is passed back to the disperser 19 via tubing 32 or another suitable mechanism. The recycled carrier fluid(s) 36' may be filtered after being condensed, and may be used when formulating more ink 17 from concentrated ink 15. In some instance when recycled carrier fluid(s) 36' are used, less or no fresh carrier fluid(s) 24 from the reservoir 22 may be released into the disperser 19.

As the intermediate transfer medium 26 continues to rotate, the ink solids remaining thereon are contacted with a medium 20 that is fed between the intermediate transfer medium 26 and an impression drum 34. The ink from the intermediate transfer medium 26 transfers to the medium 20 to form the desired image thereon.

It is to be understood that, as used herein, the singular forms of the articles "a," "an," and "the" include plural references unless the content clearly indicates otherwise.

It is further to be understood that the ranges provided herein include the stated range and any value or sub-range within the stated range. For example, a range from about 0.1 wt % to about 30 wt % should be interpreted to include not only the explicitly recited limits of about 0.1 wt % to about 30 wt %, but also to include individual values, such as 0.2 wt %, 5 wt %, 12 wt %, etc., and sub-ranges, such as from about 0.5 wt % to about 10 wt %, from about 3 wt % to about 20 wt %, etc. Furthermore, when "about" is utilized to describe a value, this is meant to encompass minor variations (up to +/−5%) from the stated value.

To further illustrate the present disclosure, examples are given herein. It is to be understood that these examples are provided for illustrative purposes and are not to be construed as limiting the scope of the disclosed example(s).

EXAMPLES

Example 1

A magenta print ready inkjet ink was prepared by dispersing about 4.6 wt % of a magenta pigment and about 2.3 wt % of a dispersant in ISOPAR® L. The magenta pigment was encapsulated as a result of this process. The particle size of the encapsulated magenta pigment was measured (via dynamic light scattering (DLS)) to be about 199 nm. The magenta ink was concentrated by evaporating the ISOPAR® L solvent. Evaporation was accomplished at room temperature by placing the ink in a shallow petri dish, and high speed air (at about 1 m/s) was passed over the surface of the Petri dish for about twenty-two hours. The ink was concentrated to about 57 wt % of nonvolatile solids (i.e., the pigment and the dispersant in this example). The concentrated ink was then dispersed by adding ISOPAR® L to obtain a new ink having about 4.6 wt % of the magenta pigment. This new ink was gently mixed on an orbital shaker for about 3 hours at about 40 rpm. The particle size of the pigment was measured to be about 184 nm after dispersing the concentrated ink in the ISOPAR® L.

Example 2

A yellow print ready inkjet ink was prepared that included about 7 wt % of an unencapsulated yellow pigment dispersed in ISOPAR® L based ink with 6.3 wt % of a dispersant. The ISOPAR® L based ink included some additional components, such as another oil, in addition to ISOPAR®. The ISOPAR® L based ink was evaporated in an oven at 70° C. for about 8 hours. About 78 wt % of the ISOPAR® L based ink was evaporated to form a concentrated yellow ink. At least some of the other oil in the ISOPAR® L based ink was not evaporated. The concentrated yellow ink had a NVS wt % of 60.5% (where the NVS value did not take into account any remaining liquid, such as remaining oil from the ISOPAR® L based ink). Then, about 78 wt % of ISOPAR® L was added to the concentrated ink, and the mixture was mixed using a magnetic stir bar for about 5 minutes. The mixture was then sonicated for about 30 minutes.

The mixture (i.e., the newly formed ink) was tested for inkjettability by continuous jetting using a piezo printhead at 40V at 5 μs and 50 kHz. The ink was jettable from the piezo printhead.

Example 3

A magenta print ready inkjet ink was prepared that included about 5 wt % of an unencapsulated magenta pigment dispersed in ISOPAR® L based ink with 4.5 wt % of a dispersant. The ISOPAR® L based ink included some additional components, such as an oil, in addition to ISOPAR®. About 68 wt % of the ISOPAR® L based ink was evaporated in an oven at 70° C. for about 8 hours to form a concentrated ink. At least some of the oil in the ISOPAR® L based ink was not evaporated. The NVS of the concentrated ink was about 29.7% (where the NVS value did not take into account any remaining liquid, such as remaining oil from the ISOPAR® L based ink). About 68% of ISOPAR® L was added into the concentrated ink, and the two were mixed with a magnetic stir bar for about 5 minutes. The mixture (i.e., the newly formed ink) was then sonicated for about 30 minutes.

The newly formed magenta ink was tested for inkjettability by jetting the ink using a DMP piezo printhead at 22V at 5 μs and 50 kHz. The newly formed magenta ink jetted similarly to the originally formed magenta ink before concentration took place.

Example 4

A yellow deagglomerated ink was prepared by dispersing (via bead milling) about 16 wt % of a yellow pigment and about 3.2 wt % of a dispersant in ISOPAR® L. The pigment particles were encapsulated with the dispersant during the dispersing to form the deagglomerated ink. Encapsulation was determined by the stability of the dispersion versus the dispersant concentration. The deagglomerated ink had an NVS concentration of about 19.2 wt % (i.e., the pigment and the dispersant), and the particle size of the yellow pigment was measured by a DLS to be about 200 nm. The deagglomerated ink was concentrated by evaporating a portion of the ISOPAR® L solvent in a vacuum oven with the sample maintained at 83° C. for 120 minutes. The deagglomerated ink was concentrated to about 80 wt % of nonvolatile solids (i.e., the pigment and the dispersant in this example), and about 20 wt % of liquid components (e.g., the ISOPAR® L) remained in the concentrated form of the ink. The concentrated ink was dispersed by adding ISOPAR® L to the concentrated ink. Addition of the ISOPAR® L to the concentrated ink was accomplished during ultrasonic agitation for about 20 minutes. The dispersion of the concentrated ink formed a new ink having about 4.0 wt % of the yellow pigment. The particle size of the pigment present in the newly formed inkjet ink was measured (using a DLS) to be about 190 nm.

While several examples have been described in detail, it will be apparent to those skilled in the art that the disclosed examples may be modified. Therefore, the foregoing description is to be considered non-limiting.

What is claimed is:

1. A concentrated inkjet ink for packaging, comprising:
    a liquid composition present in an amount that is less than 60 wt % of the concentrated inkjet ink; and
    nonvolatile solids present in an amount ranging from about 40 wt % to about 90 wt % of the concentrated inkjet ink, the nonvolatile solids including encapsulated pigment particles having a particle size ranging from about 50 nm to about 500 nm, and a dispersant;
    wherein the concentrated inkjet ink is dispersible in an ink vehicle to form a print ready inkjet ink.

2. The concentrated inkjet ink as defined in claim 1 wherein the particle size ranges from about 100 nm to about 200 nm.

3. The concentrated inkjet ink as defined in claim 1 wherein the dispersant is a cationic polyamine, the liquid composition includes an oil-based carrier, and the pigment particles are pigment yellow 213 pigment particles; and wherein in a deagglomerated ink or a modified deagglomerated ink before concentrating, the dispersant is present in an amount above 2.55 wt %, and a pigment loading is about 6.0 wt %.

4. The concentrated inkjet ink as defined in claim 1 wherein the dispersant is a non-ionic polyamine, the liquid composition includes an oil-based carrier, and the pigment particles are pigment yellow 180 pigment particles; and wherein in a deagglomerated ink or a modified deagglomerated ink before concentrating, the dispersant is present in an amount above 1.05 wt %, and a pigment loading is about 6.0 wt %.

5. The concentrated inkjet ink as defined in claim 1 wherein the nonvolatile solids further include a viscosity modifier, a polymer, or combinations thereof.

6. The concentrated inkjet ink as defined in claim 2 wherein: the encapsulated pigments are present in the concentrated ink in an amount ranging from about 25 wt % to about 70 wt % of the concentrated ink; the dispersant is present in an amount ranging from about 2 wt % to about 30 wt %; the viscosity modifier is present in the concentrated ink in an amount that is less than about 10 wt % of the concentrated ink; the polymer is present in the concentrated ink in an amount that is less than about 10 wt % of the concentrated ink; and combinations thereof.

7. A printing system, comprising:
    an ink container containing the concentrated inkjet ink as defined in claim 1;
    an ink tank including a disperser for dispersing the concentrated ink in an other liquid composition to form a print ready inkjet ink; and
    a printhead for depositing the print ready inkjet ink.

8. The printing system as defined in claim 7, further comprising:
    a suction tube positioned to collect evaporated carrier fluid from the deposited print ready inkjet ink;
    a condenser that condenses the evaporated carrier fluid; and
    tubing that delivers the condensed carrier fluid back to the ink tank including the disperser.

9. The printing system as defined in claim 7 wherein the printing system includes architecture for routing an other liquid composition to the ink tank, and wherein when the other liquid composition is present in the ink tank, the concentrated ink disperses in the other liquid composition to form the print ready inkjet ink.

10. The printing system as defined in claim 7 wherein the disperser includes equipment for accomplishing any of ultrasonic mixing or mechanical mixing.

11. The printing system as defined in claim 10 wherein the equipment for accomplishing the mechanical mixing includes equipment for high shear mechanical mixing, equipment for high pressure mixing, or equipment for mechanical pumping.

* * * * *

UNITED STATES PATENT AND TRADEMARK OFFICE
CERTIFICATE OF CORRECTION

PATENT NO. : 8,562,125 B2
APPLICATION NO. : 13/868791
DATED : October 22, 2013
INVENTOR(S) : Doris Pik-Yiu Chun et al.

It is certified that error appears in the above-identified patent and that said Letters Patent is hereby corrected as shown below:

In the Claims:

In column 16, line 13, in Claim 6, delete "claim 2" and insert -- claim 5 --, therefor.

Signed and Sealed this
Twenty-eighth Day of January, 2014

Michelle K. Lee
*Deputy Director of the United States Patent and Trademark Office*